US012608132B2

(12) United States Patent (10) Patent No.: US 12,608,132 B2

Underwood et al. (45) Date of Patent: *Apr. 21, 2026

(54) DATATYPE ENGINE TO SUPPORT HIGH PERFORMANCE COMPUTING

(71) Applicant: Hewlett Packard Enterprise Development LP, Spring, TX (US)

(72) Inventors: Keith D. Underwood, Fort Collins, CO (US); Robert L. Alverson, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/905,441

(22) Filed: Oct. 3, 2024

(65) Prior Publication Data

US 2025/0028450 A1 Jan. 23, 2025

Related U.S. Application Data

(63) Continuation of application No. 17/976,721, filed on Oct. 28, 2022, now Pat. No. 12,131,029.

(51) Int. Cl.
*G06F 3/06* (2006.01)

(52) U.S. Cl.
CPC .......... *G06F 3/0613* (2013.01); *G06F 3/0659* (2013.01); *G06F 3/067* (2013.01)

(58) Field of Classification Search
CPC ....... G06F 3/0613; G06F 3/0659; G06F 3/067
See application file for complete search history.

(56) References Cited

U.S. PATENT DOCUMENTS

| | | | |
|---|---|---|---|
| 7,249,202 B2 | 7/2007 | Simon et al. | |
| 7,392,256 B2 | 6/2008 | Jia et al. | |

(Continued)

FOREIGN PATENT DOCUMENTS

| | | |
|---|---|---|
| CN | 112506568 A | 3/2021 |
| CN | 113900965 A | 1/2022 |
| CN | 114666288 A | 6/2022 |

OTHER PUBLICATIONS

Ma, Teng, et al. "Thinking more about RDMA memory semantics." 2021 IEEE International Conference on Cluster Computing (CLUSTER). IEEE, 2021. (Year: 2021).*

(Continued)

*Primary Examiner* — Nicholas J Simonetti
(74) *Attorney, Agent, or Firm* — Yao Legal Services, Inc.

(57) ABSTRACT

A method and apparatus are provided for facilitating a datatype engine (DTE) to support high performance computing. A network interface card (NIC) receives, via a message passing interface, a command to read data from a host memory. The NIC determines that the command indicates a first datatype descriptor stored in the NIC. The NIC forms, based on the command, a packet which indicates a base address and a length associated with the data to be read from the host memory and passes the packet to the DTE. The DTE generates a plurality of read requests comprising offsets from the base address and corresponding lengths based on the first datatype descriptor. The DTE passes the plurality of read requests to a direct memory access module, thereby allowing the NIC to access the host memory while eliminating copies of the data on the host during transfer of the command across a network.

20 Claims, 6 Drawing Sheets

(56) References Cited

U.S. PATENT DOCUMENTS

| | | | |
|---|---|---|---|
| 7,694,310 | B2 | 4/2010 | Huang et al. |
| 7,835,359 | B2 | 11/2010 | Kim et al. |
| 8,621,029 | B1 | 12/2013 | Grier et al. |
| 10,607,392 | B2 | 3/2020 | Vembu et al. |
| 10,884,996 | B1 | 1/2021 | Suresh et al. |
| 11,726,666 | B2 | 8/2023 | Ben-Ishay et al. |
| 12,197,359 | B2 * | 1/2025 | Venkataramani ... G06F 9/45545 |
| 12,277,431 | B2 * | 4/2025 | Chen ..................... G06F 9/5077 |
| 2008/0002578 | A1 | 1/2008 | Coffman et al. |
| 2019/0196745 | A1 * | 6/2019 | Persson ................... G06F 13/28 |
| 2019/0347125 | A1 | 11/2019 | Sankaran et al. |
| 2021/0117353 | A1 | 4/2021 | Kasichainula et al. |
| 2021/0400124 | A1 | 12/2021 | Pardo et al. |
| 2021/0406026 | A1 | 12/2021 | Forsyth et al. |
| 2022/0121590 | A1 | 4/2022 | Iyer et al. |
| 2022/0138021 | A1 | 5/2022 | Rimmer et al. |
| 2023/0153264 | A1 | 5/2023 | Lin et al. |
| 2023/0403229 | A1 | 12/2023 | Gorodetsky et al. |
| 2024/0272835 | A1 * | 8/2024 | Maharana ........... G06F 12/0868 |

OTHER PUBLICATIONS

Shivam, Piyush, Pete Wyckoff, and Dhabaleswar Panda. "EMP: Zero-copy OS-bypass NIC-driven Gigabit Ethernet message passing." Proceedings of the 2001 ACM/IEEE conference on Supercomputing. 2001. (Year: 2001).*

Alexandra et al., "On the Expected and Observed Communication Performance with MPI Derived Datatypes", 2016, 13 pages.
Hoefler et al., "Parallel Zero-Copy Algorithms for Fast Fourier Transform and Conjugate Gradient using MPI Datatypes", 2010, 9 pages.
Jenkins et al., "Processing MPI Derived Datatypes on Noncontiguous GPU-Resident Data", IEEE Transactions on Parallel and Distributed Systems, vol. XX, No. XX,, 2020, 11 pages.
McCalpin et al., "Memory Bandwidth and Machine Balance in Current High Performance Computers", 1995, 7 pages.
Message Passing Interface Forum, "MPI: a Message-Passing Interface Standard Version 3.1", Jun. 4, 2015, 868 pages.
Prabhu et al., "DAME: a Runtime-Compiled Engine for Derived Datatypes", Sep. 21-23, 2015, 10 pages.
Schneider et al., "MPI Datatype Processing using Runtime Compilation", 2013, 6 pages.
Tanabe, Noboru, and Hironori Nakajo. "Acceleration for MPI derived datatypes using an enhancer of memory and network." 2010 IEEE International Symposium on Parallel & Distributed Processing, Workshops and Phd Forum (IPDPSW). IEEE, 2010. (Year: 2010).
Wong et al., "NAS Parallel Benchmarks I/O Version 2.4", NAS Technical Report NAS-03-002 Jan. 2003, 6 pages.
Xiong et al., "MPI Derived Datatypes: Performance and Portability Issues", 2018, 10 pages.
Wikipedia, "Message Passing Interface", available online at <https://en.wikipedia.org/w/index.php?title=Message_Passing_Interface&oldid=1112449606>, Sep. 26, 2022, 16 pages.

* cited by examiner

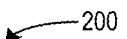

```
MPI_Type_contiguous(3, MPI_FLOAT,
     &su3_vector_mpi_t);
MPI_Type_vector(squaresize[TUP],
     squaresize[XUP]*squaresize[YUP]/2,
     squaresize[XUP]*squaresize[YUP]
          *squaresize[ZUP]/2,
     su3_vector_mpi_t,
     &field_neighbor_ddt[0][0][ZUP]);

MPI_Type_vector(
     squaresize[ZUP]*squaresize[TUP],
     squaresize[XUP]/2,
     squaresize[XUP]*squaresize[YUP]/2,
     su3_vector_mpi_t,
     &field_neighbor_ddt[0][0][YUP]);

MPI_Type_vector(squaresize[YUP]
     *squaresize[ZUP]
     *squaresize[TUP]/2, 1,
     squaresize[XUP]/2,
     su3_vector_mpi_t,
     &field_neighbor_ddt[0][0][XUP]);
```

APPARATUS 600

COMMAND UNIT
602

FIRST DATATYPE ENGINE
UNIT
608

PACKET FORMATION UNIT
604

SECOND DATATYPE ENGINE
UNIT
610

DIRECT MEMORY ACCESS
UNIT
606

DATATYPE DESCRIPTOR-
MANAGING UNIT
612

DATATYPE ENGINE TO SUPPORT HIGH PERFORMANCE COMPUTING

CROSS-REFERENCE TO RELATED APPLICATIONS

This application is a continuation of U.S. patent application Ser. No. 17/976,721, filed on Oct. 28, 2022, the entire contents of which are 10 incorporated by reference herein. Applicant hereby rescinds any disclaimer of claim scope in the parent applications or the prosecution history thereof and advises the USPTO that the claims in this application may be broader than any claim in the parent applications.

BACKGROUND

Field

User applications may send data which resides in non-contiguous buffers. Similarly, these user applications may receive data into non-contiguous buffers. In traditional systems, a typical flow can involve copying or packing the data into a contiguous send buffer, transferring the data, and copying or unpacking the data from a contiguous receive buffer into the appropriate application locations. These data copy operations (i.e., the pack and unpack) occur in software and are thus serialized with the data transfer communications, which can significantly extend the communication time.

BRIEF DESCRIPTION OF THE FIGURES

FIG. 2 illustrates an exemplary code excerpt for an application using datatypes, in accordance with an aspect of the present application.

In the figures, like reference numerals refer to the same figure elements.

DETAILED DESCRIPTION

Figure 1:
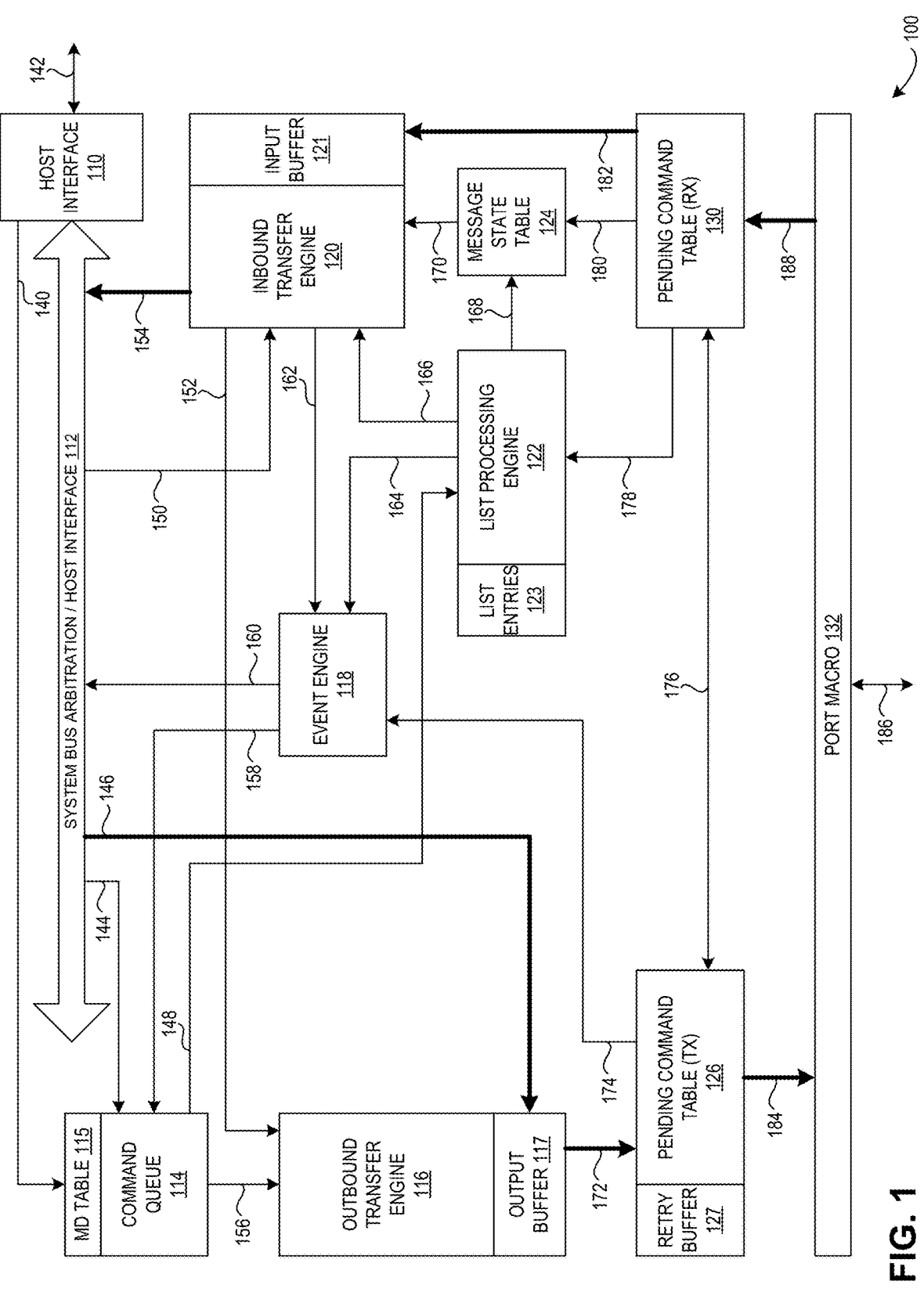
FIG. 1 illustrates a diagram of an architecture which facilitates a datatype engine to support high performance computing, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

User applications may send data which resides in non-contiguous buffers. Similarly, these user applications may receive data into non-contiguous buffers. In traditional systems, a typical flow can involve copying or packing the data into a contiguous send buffer, transferring the data, and copying or unpacking the data from a contiguous receive buffer into the appropriate application locations. These data copy operations (i.e., the pack and unpack) occur in software and are thus serialized with the data transfer communications, which can significantly extend the communication time.

Current software interfaces may allow a user to express the data layout in its native form. One commonly used software interface is the Message Passing Interface (MPI), in which a user can provide a base address to start a transfer and a datatype to apply to that transfer. MPI also provides a mechanism called "derived datatypes," which can describe the data layout in host memory and use that description for certain MPI calls (e.g., MPI_Send and MPI_Recv). Historically, using derived datatypes in MPI can result in poor performance, because the library must interpret the description in order to perform copies in to and out of an internal buffer for the MPI_Send and the MPI_Recv commands, respectively. As a result, the pack and unpack operations are still performed in software and still serialized with the communications, which can result in inefficiencies in the overall performance of data-related operations, such as data gather/scatter operations.

The described aspects provide a system which addresses these issues, by providing a datatype engine (DTE) in hardware which performs the gather/scatter operations, thus eliminating the inefficient data copies used in the prior software solutions. The datatype engine can reside in the network interface card (NIC) or an application-specific integrated circuit (ASIC) of the NIC, including as part of an outbound packet engine and an inbound packet engine. The datatype engine can generate a series of addresses and lengths based on a datatype descriptor. The datatype descriptor can be an input/output vector (IOVEC) structure with relative addressing and can describe a multi-dimensional array defined with a count, a block size, and a stride. By using the datatype descriptor as part of the data path, the datatype engine in both the transmit path (e.g., handling read operations from host memory by the outbound packet engine) and the receive path (e.g., handling write operations to host memory by the inbound packet engine) can result in reducing the communication time involved with data transfer over a network. This can result in a more efficient transfer of messages between network entities, which can in turn result in a more efficient use of resources, e.g., to support high performance computing.

The described aspects of the datatype engine can perform gather/scatter operations while addressing several challenges. A first challenge is ensuring that the representation of a datatype covers common use cases while remaining compact. This may be difficult when dealing with codes which build arrays of structures. The described aspects can represent a datatype with three strides, three counts, and a representation of a base block. The system can represent the base block using a length, a valid number of bytes, and a bit mask to indicate which bytes are valid. This datatype can represent an arbitrary three-dimensional (3D) array of C structures (up to 256 bytes per structure) using less than 64 bytes of storage for each datatype.

A second challenge involves the use of redundant memory resources as part of compaction. Reading data from memory and placing the read data into a temporary local buffer before compacting the valid bytes may require redundant memory resources. The described aspects address this challenge by compressing 256 bytes with an arbitrary bit mask to capture only the valid bytes in only eight stages of 2 to 1 multiplexers. The system can further leverage the POPCNT instruction found in x86 processors to quickly and efficiently encode additional information to reduce the amount of logic needed for each stage of the compaction.

A third challenge involves handling out-of-order packets. Because modern HPC networks can leverage adaptive routing to optimize the overall throughput, some packets may arrive out of order. These out-of-order packets can be of two types: packets received as a "Put" (e.g., a write operation); and packets received in response to a "Get" (e.g., a read operation). For Put operations, a first node may send data to a second node, and the data packets may arrive out of order at the second node. For Get operations, a first node can request data from a second node, and the data packets as part of the response may be received out of order at the first node.

To handle the Get operations, aspects of the described datatype engine (DTE) can pre-compute the starting state for each packet as the Get requests are formed. The system can store this starting state with the other information needed to handle the Get response, which allows the out-of-order response to use the stored state to initialize the DTE.

To handle the Put operations, the receiving side can provide the datatype for receiving the Put operation. The software associated with the system (e.g., the NIC ASIC) can pre-compute a small amount of DTE state (e.g., 8 bytes) corresponding to the start of each packet. To process an out-of-order packet, the system can combine a lookup from host memory with the datatype descriptor. The system can further optimize the target or destination of the Put operation to reuse the state in the DTE from one packet to the next packet. Even when using adaptive routing, packets may arrive mostly in order. Reusing or holding the state in the DTE can eliminate the host memory lookup.

In addition to addressing these challenges to improve the performance of data transfers across a network and to support high performance computing, the described system can include other aspects. One aspect can involve the ordering of datatype commands (e.g., installing a datatype descriptor in a DTE of a NIC) relative to payload commands (e.g., performing a user read/write command). A datatype must be created and setup or installed prior to being used by a payload or user command. Commands may travel through the NIC via multiple paths, e.g., based on a series of parallel queues. The system can select the queue by performing a hash of various fields in a command or associated packet. As a result, both the command to install a datatype descriptor into the DTE of the NIC and the user command can have a flow hash which enables the two commands to take the same path. Furthermore, the system can include an event which indicates that a datatype command has completed, as shown in the communications with the event engine depicted below in relation to FIG. 1. Once the datatype command has completed, the installed datatype descriptor can be used by many independent subsequent commands.

Another aspect of the described system can involve datatype selection and storage efficiency. A command to begin a new message must indicate the datatype that it wishes to use. However, including a full datatype descriptor with each command may not be efficient or practical. In addition, datatypes may be frequently structured the same between processes on a given node which are part of the same user job. The described aspects can include an allocation mechanism for datatypes which can result in improving the storage efficiency as well as the efficiency of new message commands. The software, e.g., the operating system (OS), can allocate datatype storage space and provide a datatype key to the user. The system may use a single key space for datatype descriptors, which single key space can be shared between processes. The hardware can provide an enforcement mechanism which ensures that only processes that are part of the same application can use a given key. The user can include the given key in a new message to specify which datatype to use. The system can use a null entry for the datatype key to indicate that a command or transfer does not include a datatype.

Yet another aspect of the described system can relate to the use of both absolute and relative addressing in the IOVEC structure used by the datatype engine. Prior solutions can use absolute addressing in a gather/scatter list to support use cases involving the OS kernel-mode. However, the interface for user level software generally uses relative addressing, which can create limitations when using gather/scatter engines by the MPI. In using the IOVEC structure in the described aspects, the DTE can retrieve data from host memory based on a list of addresses and lengths using two different modes of addressing. The first mode is absolute addressing, in which the addresses retrieved from host memory are the virtual addresses to be used, i.e., using a set of absolute address/length pairs in an IOVEC. The second mode is relative addressing, in which the addresses retrieved from host memory are used as offsets from the base virtual address provided by the user in a new message, where the offset can be obtained from an IOVEC (list of offsets and lengths) or from a datatype descriptor.

Another aspect of the described system involves the efficiency of datatype storage, IOVECs, and commands. In order to start a new message, prior solutions can add a pointer to an IOVEC to each command, which can result in increasing the size of the command and decreasing the efficiency of the command interface. The system can encode and setup or install IOVECs in the same way as other datatypes. However, some IOVEC use cases may be used only once, i.e., the system creates the IOVEC, uses it for one command ("use once"), and discards it. Because the command ordering works in collaboration with the IOVEC approach, the command ordering logic described above can allow the system to maintain existing command formats while still ensuring an efficient setup path for these "use once" IOVECs.

Thus, aspects of the described system can address the above-described challenges by providing a datatype engine (DTE) which generates a series of addresses and lengths based on a datatype descriptor. The datatype descriptor can be an IOVEC structure with relative addressing and can describe a multi-dimensional array defined with a count, a block size, and a stride, as described below in relation to FIGS. 2 and 4. An overall architecture of a system (e.g., a NIC) which includes an outbound transfer engine and an inbound transfer engine is described below in relation to FIG. 1, while a detailed diagram of an outbound transfer engine with a DTE module in communication with other modules is described below in relation to FIG. 3.

Exemplary High-Level Architecture

FIG. 1 illustrates a diagram 100 of an architecture which facilitates a datatype engine to support high performance computing, in accordance with an aspect of the present application. Diagram 100 can depict a network interface card (NIC), which includes various components or modules, as well as interfaces and communications. On one of the NIC, a host interface 110 exists between components of the NIC and a host. Host interface 110 can handle communications with the host (via a communication 142). On the other end, a port macro 132 exists between the NIC components and a network, and can handle communications with the network (via a communication 186). In general, components on the left side of diagram 100 pertain to an outbound path and can process transmit operations related to performing read operations from host memory (indicated by the bold-lined communications of 146, 172, and 184, described below), while components on the right side of diagram 100 pertain to an inbound path and can process receive operations related to performing write operations to host memory (indicated by the bold-lined communications of 188, 182, and 154).

Host interface 110 can receive data from the various NIC components via a system bus arbitration/host interface 112. Host interface 110 can also send a command list pointer or a command with data to a command queue 114 (via a communication 140), which can include a metadata (MD) table 115. Command queue 114 can send portal and Ethernet operations (e.g., relating to read operations in the transmit path) to an outbound transfer engine 116 (via a communication 156), which can include an outbound buffer 117 for storing data relating to operations performed by outbound transfer engine 116. Command queue 114 can also receive commands related to reading data, e.g., a direct memory access (DMA) fetch command (via a communication 144) as well as events from an event engine 118 (via a communication 158). Command queue 114 can also transmit append commands to a list processing engine 122 (via a communication 148).

Outbound transfer engine 116 can include an instance of a datatype engine (not shown in FIG. 1) and can perform various operations to generate requests or commands relating to read DMA operations. Outbound transfer engine 116 can receive outbound DMA data from host memory (via a communication 146 from host interface 112), which data can be stored in output buffer 117. A detailed description of outbound transfer engine 116 is provided below in relation to FIG. 3.

Subsequent to the datatype engine of outbound transfer engine 116 using an IOVEC with relative addressing and describing a multi-dimensional array in the manner described herein, outbound transfer engine 116 can output the requests or commands to a pending command table (transmit (TX)) 126 (via a communication 172). Pending command table 126 can include a retry buffer 127. Pending command table 126 can send a completion notification to event engine 118 (via a communication 174) upon completing a respective command. Pending command table 126 can transmit outbound packets corresponding to read commands (via a communication 184 to port macro 132).

The NIC can receive inbound packets to be written to host memory (via a communication 188). The inbound packets can be transmitted to a pending command table (receive (RX)) 130. Pending command table 130 can subsequently send information to a message state table 124 (via a communication 180) and a message to list processing engine 122 (via a communication 178), which can include list entries 123. List processing engine 122 can send information to message state table 124 (via a communication 168), which can send information to an inbound transfer engine 120 (via a communication 170). Inbound transfer engine 120 can include an input buffer 121. List processing engine 122 can also send a memory or datatype descriptor to inbound transfer engine 120 (via a communication 166) to be stored in a datatype engine (not shown) of inbound transfer engine 120. List processing engine 122 can further send events to event engine 118 (via a communication 164). Pending command table 130 can also transmit to inbound transfer engine 120 a payload associated with the inbound packets (via a communication 182), which payload can be stored in input buffer 121. Inbound transfer engine 120 can include an instance of a datatype engine (not shown in FIG. 1) and can perform various operations to generate requests or commands relating to write DMA operations. Subsequent to the datatype engine of inbound transfer engine 120 using an IOVEC with relative addressing and describing a multi-dimensional array in the manner described herein, inbound transfer engine 120 can transmit inbound DMA data to host memory (via a communication 154 to host interface 112).

Inbound transfer engine 120 can receive data from host interface 112 (via a communication 150) and can also send a completion notification to event engine 118 (via a communication 162) upon completing a respective command. In addition to receiving completions from pending command table 126 and inbound transfer engine 120 (via, respectively, communications 174 and 162), event engine 118 can send event-related information to host interface 112 (via a communication 160). The pending command tables in the transmit and receive paths can communicate a response state (tables 126 and 130 via a communication 176), and inbound transfer engine 120 can also transmit replies to outbound transfer engine 116 (via a communication 152). In the same way that outbound transfer engine 116 can form a packet and that the DTE of outbound transfer engine 116 can form a plurality of reads, list processing engine 122 can form an address for writing a packet and pass that address to the DTE of inbound transfer engine 120. The DTE of inbound transfer engine 120 can form a plurality of write requests comprising offsets from that address and corresponding lengths based on a given datatype descriptor. It would be obvious to anyone skilled in the practice of the art that this mechanism could be employed on the input processing of a packet as well.

Overview of Datatype Descriptors

In a typical NIC implementation, user software can supply a command which indicates a virtual address and a length of data to be transferred. The NIC can receive the command and translate the virtual address. Subsequently, the NIC can issue reads to the host memory (for transmitting data, e.g., in a Get operation) or writes to the host memory (for receiving data, e.g., in a Put operation). In conventional solutions, these issued reads and writes to the host memory are generally for large blocks of contiguous data.

The described aspects provide a datatype engine which generates a series of addresses and lengths based on a datatype or a "datatype descriptor." Datatypes can natively express data layouts in application memory, which can result in eliminating the resource-consuming copies. That is, a datatype is a way to describe the native data layout in memory. Without a datatype engine as described herein, central processing units (CPUs), general processing units (GPUs), and advanced memory systems are used to perform the described data copies. However, because operations using these systems can be expensive (i.e., in general, CPUs, GPUs, and advanced memory systems are better suited for other work), using these systems may be inefficient.

One example of a datatype descriptor form can be a multi-dimensional array descriptor, in which the datatype engine uses parameters to describe an array in host memory, as described below in relation to the matrix transpose example of FIG. 4. The multi-dimensional array can include: a number of elements in each dimension; a size of a block to be transferred; and a stride in each dimension. The datatype descriptor can also include a handle to the old datatype name and the new datatype name, as described below in relation to FIGS. 2 and 4. Another example of a datatype descriptor form can be an input/output (I/O) vector (IOVEC), in which the DTE retrieves a list of addresses from host memory. The IOVEC may use either relative addressing or absolute addressing. In relative addressing, the DTE can retrieve data based on addresses which are "offsets" from a base virtual address provided by a user, while in absolute addressing, the DTE can retrieve data based on addresses which are the virtual addresses to be used.

Exemplary Code for Application Using Datatypes

FIG. 2 illustrates an exemplary code excerpt 200 for an application using datatypes, in accordance with an aspect of the present application. A section 210 can indicate a datatype "MPI_Type_contiguous" which allows replication of a datatype into contiguous locations. Sections 212, 214, and 216 can indicate a datatype "MPI_Type_vector" which allows replication of a datatype into locations with equally spaced blocks, where each block can be obtained by concatenating the same number of copies of the old datatype. The space between the blocks can be a multiple of the extent of the old datatype. The "MPI_Type_vector" can indicate a structure comprising a multi-dimensional array which includes: a count corresponding to a number of blocks or elements in each dimension; a block size or length corresponding to a number of elements in each block; a stride in each dimension, corresponding to a number of elements between the start of each block; an indicator of an existing or an old datatype; and a handle to a new datatype.

Section 210 can create a three element vector of floats and be used to construct descriptions of multiple faces (e.g., three) of a matrix. Using the datatype indicated in sections 214 and 216 can result in transmitting data in large chunks or many large chunks, which chunks can be aggregated up to a message and can result in an efficient transfer. However, using the datatype indicated in section 212 can result in performing a gather/scatter of 12 bytes from many locations, which may not be as efficient as using the datatype of sections 214 and 216. In comparing the NIC performance against the performance of CPUs and GPUs, the datatype engine in the NIC with datatype descriptors can perform more efficiently when transferring data in larger chunks (e.g., 128 byte segments) rather than in smaller chunks (e.g., 8 byte or 12 byte segments).

Outbound Packet Engine and the Transmit Path

Figure 3:
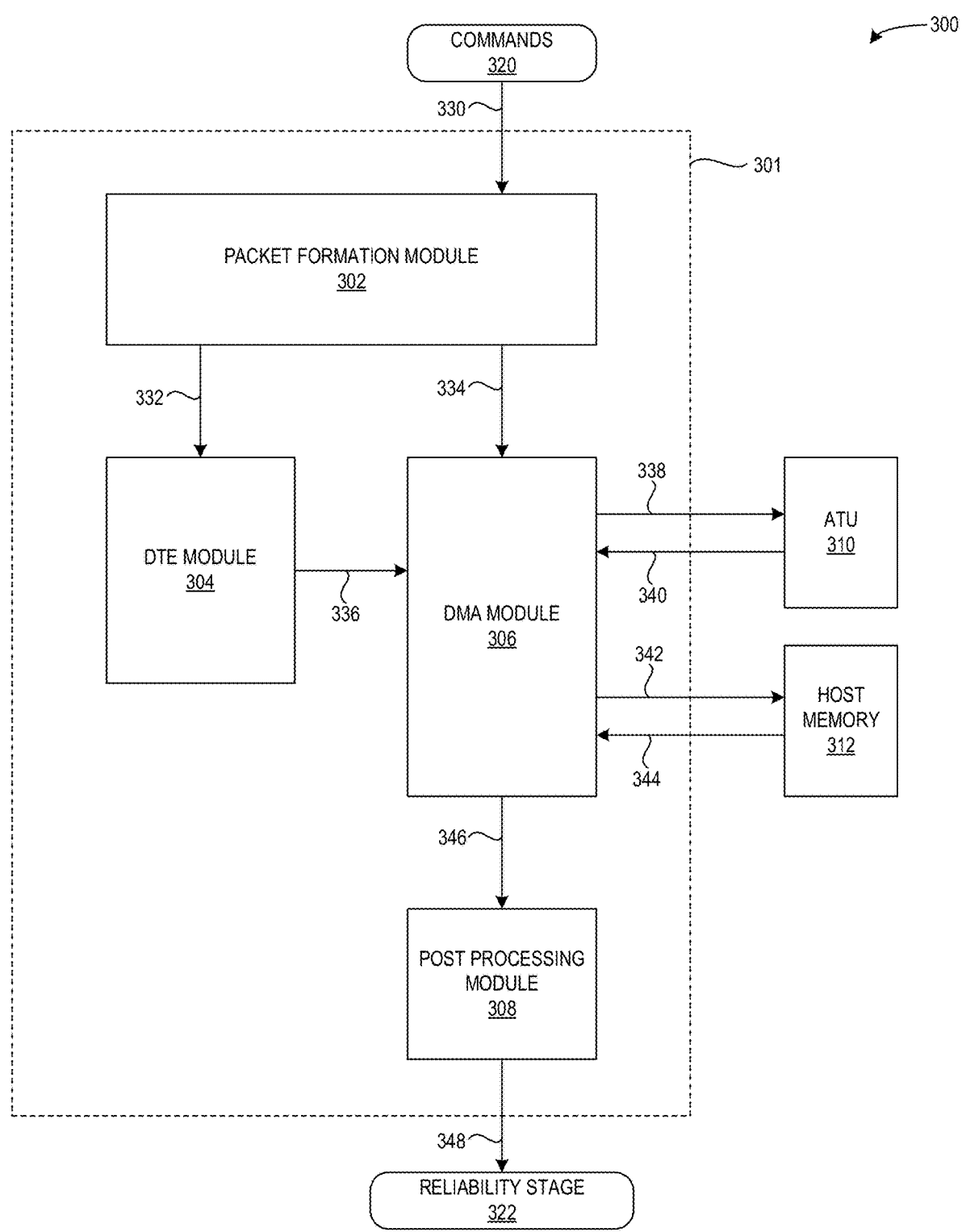
FIG. 3 illustrates a diagram of an outbound packet engine with a datatype engine as part of the transmit path, in accordance with an aspect of the present application.

As described above in relation to FIG. 1, the datatype engine can be integrated with both the transmit and the receive logic in, respectively, the outbound packet engine and the inbound packet engine. FIG. 3 illustrates a diagram 300 of an outbound packet engine 301 with a datatype engine as part of the transmit path, in accordance with an aspect of the present application. Outbound packet engine (OXE) 301 can include: a packet formation module 302; a datatype engine (DTE) module 304; a direct memory access (DMA) module 306; and a post processing module 308. OXE 301 can take as input data from commands 320 and can output data packets to a reliability stage 322. In addition, OXE 301 can communicate with an address translation unit (ATU) 310 and a host memory 312.

During operation, OXE 301 can receive a command, e.g., from a command queue of commands 320 (via a communication 330). The command can be received via a message passing interface (MPI) and can be a command to read data from a host memory. In a standard path (i.e., where the datatype descriptor is not present and thus bypassing the DTE), packet formation module 302 can form a packet which indicates a header, an address, and a length associated with the data to be read from the host memory, referred to as a "non-DTE DMA command." This standard non-DTE DMA command can be sent to DMA module 306 (via a communication 334). DMA module 306 can retrieve the corresponding address translations from ATU 310, e.g., by sending a virtual address 338 to ATU 310 and receiving a physical address 340 from ATU 310. DMA module 306 can subsequently issue one or more read requests to host memory 312 (via a communication 342) and receive the corresponding one or more read responses from host memory 312 (via a communication 344). DMA module 306 can transmit the read responses to post processing module 308 (via a communication 346), which processed data can be transmitted as output to reliability stage 322 (via a communication 348).

In the case where the datatype descriptor is present (e.g., indicated as a handle to a previously stored datatype descriptor) in the command, packet formation module 302 can form a packet which indicates or references the datatype descriptor as well as a base address and a length associated with the data to be read from the host memory, referred to as a "DTE command." This DTE command can be sent to DTE module 304 (via a communication 332). DTE module 304 can identify or determine that the datatype descriptor indicated in the packet matches a datatype descriptor stored in DTE module 304, e.g., as previously configured and stored by a user. Using the identified matching datatype descriptor, DTE module 304 can generate a plurality of read requests with offsets from the base address and corresponding lengths. DTE module 304 can subsequently transmit these generated read requests to DMA module 306 (as DMA commands via a communication 336). DMA module 306 can perform the address translation (if needed) and the read retrieval operations described above in relation to communications 338, 340, 342, and 344 as well as the subsequent operations relating to post processing module 308 and reliability stage 322.

Example: Matrix Transpose for an FFT Using a Datatype Descriptor

Figure 4:
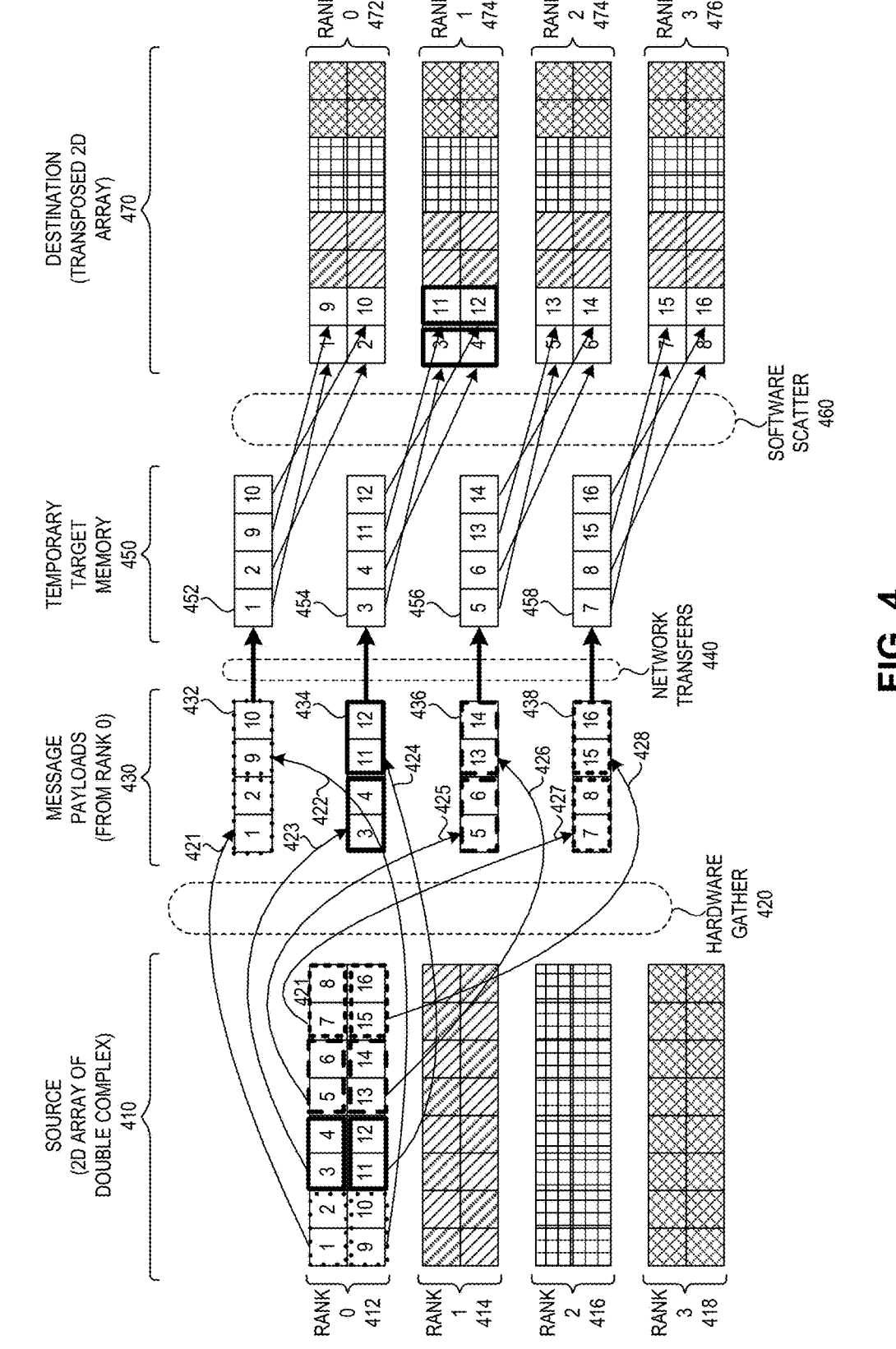
FIG. 4 illustrates an example of a matrix transpose for a Fast Fourier transform (FFT) using a datatype descriptor, in accordance with an aspect of the present application.

FIG. 4 illustrates an example of a matrix transpose for a Fast Fourier transform (FFT) using a datatype descriptor, in accordance with an aspect of the present application. FIG. 4 can include: a source 410 depicted with various ranks; message payloads 430 (from an exemplary rank of source 410); a temporary target memory 450 corresponding to message payloads 430; and a destination 470, also depicted with corresponding various ranks.

In FIG. 4, source 410 can include a two-dimensional (2D) array of double complex floating point numbers using a datatype descriptor of "MPI_Type_vector (2, 2, 8, MPI_DOUBLE_COMPLEX, &new type)." This datatype descriptor indicates that the base datatype is a double complex of 16 bytes, the count or number of elements is 2, the block size is 2 elements (32 bytes), and the stride between the blocks is 8. "MPI_DOUBLE_COMPLEX" is a standard base datatype in MPI that refers to a complex, double precision floating point number. Destination 470 can include a transposed 2D array of double complex using a datatype descriptor of "MPI_Type_vector(2, 1, 8, MPI_DOUBLE_COM-PLEX, &column)" or "MPI_Type_vector(2, 1, 1, column, &array)."

The system can transfer the data from source 410 to destination 470 based on the datatype descriptors, using a hardware gather operation 420 (by a datatype engine performing a read operation in the transmit path, as depicted in FIGS. 1 and 3). The data can be gathered into various message payloads (e.g., a buffer on a NIC) and subsequently sent over the wire (via network transfers 440). The data can be received into temporary target memory 450 (e.g., a host memory of the destination or target side). The target side may use a software scatter operation 460 to place the data into user-provided buffers (e.g., as a transposed two-dimensional array). In some examples, if the target side has a NIC which includes an inbound transfer engine with a datatype engine (as described above in relation to FIG. 1), the target side may use a hardware scatter operation, i.e., the NIC inbound transfer engine can use its DTE to execute the write operation.

For example, source 410 can include four ranks, indicated as a rank 0 412, a rank 1 414, a rank 2 416, and a rank 3 418. Each rank can include two rows, where each square in a row corresponds to 16 bytes representing the base datatype of a double complex. For example, in rank 0 412, blocks of two elements can be gathered into message payloads 430: a block labeled with "1,2" elements can be gathered into a message payload 432 (via a communication 421); a block labeled with "3,4" elements can be gathered into a message payload 434 (via a communication 423); a block labeled with "5,6" elements can be gathered into a message payload 436 (via a communication 425); a block labeled with "7,8" elements can be gathered into a message payload 438 (via a communication 427); a block labeled with "9,10" elements can be gathered into message payload 432 (via a communication 422); a block labeled with "11,12" elements can be gathered into message payload 434 (via a communication 424); a block labeled with "13,14" elements can be gathered into message payload 436 (via a communication 426); and a block labeled with "15,16" elements can be gathered into message payload 438 (via a communication 428). The path of the data represented by the blocks of "3,4" and "11,12" can be followed as indicated by the bold-lined border around those blocks. Similarly: the data represented by the blocks of "1,2" and "9,10" is indicated by a circle-dotted line border; the data represented by the blocks of "5,6" and "13,14" is indicated by a heavy dashed-line border; and the data represented by the blocks of "7,8" and "15,16" is indicated by a thin dashed-line border.

Message payloads 432, 434, 436, and 438 can be transferred across a network (via 440) and be placed in, respectively, buffers 452, 454, 456, and 458 of temporary target memory 450. Software on the target side can perform a scatter operation (460) and place the data in transposed 2D array 470. Destination 470 can include four ranks, indicated as a rank 0 472, a rank 1 474, a rank 2 476, and a rank 3 478. For example, FIG. 4 depicts that the two blocks of "3,4" and "11,12" were gathered by the source hardware (e.g., the source NIC via the hardware gather operation 420) based on the datatype descriptor in which the count is 2, the block size is 2, and the stride is 8. These two blocks are placed in two separate columns of rank 1 474.

Similarly, the blocks shown in rank 1 414 (indicated with a right-slanting fill pattern) are gathered by the source hardware, transferred across the network, placed in the temporary target memory, and scattered by the destination software into columns (as indicated by the four blocks of similar right-slanting fill pattern in each of ranks 472, 474, 476, and 478). Additionally, the blocks shown in rank 2 416 (indicated with a perpendicular crosshatch fill pattern) are gathered by the source hardware, transferred across the network, placed in the temporary target memory, and scattered by the destination software into columns (as indicated by the four blocks of similar perpendicular crosshatch fill pattern in each of ranks 472, 474, 476, and 478). Also, the blocks shown in rank 3 418 (indicated with a diagonal crosshatch fill pattern) are gathered by the source hardware, transferred across the network, placed in the temporary target memory, and scattered by the destination software into columns (as indicated by the four blocks of similar diagonal crosshatch fill pattern in each of ranks 472, 474, 476, and 478).

While the example of FIG. 4 depicts a hardware gather operation by a datatype engine on the source side (e.g., operation 420) and a software scatter operation by the target side (e.g., operation 460), in some aspects, a datatype engine may be used by both the source side and the target side. That is, both the source side gather and the target side scatter operations may be performed in hardware by a respective datatype engine. In still other aspects, the source side may perform a software gather operation while the target side may use a datatype engine to perform a hardware scatter operation. These variations are all possible and may depend upon application usage or the specific circumstances of data transmission.

Method for Facilitating a Datatype Engine to Support High Performance Computing

Figure 5:
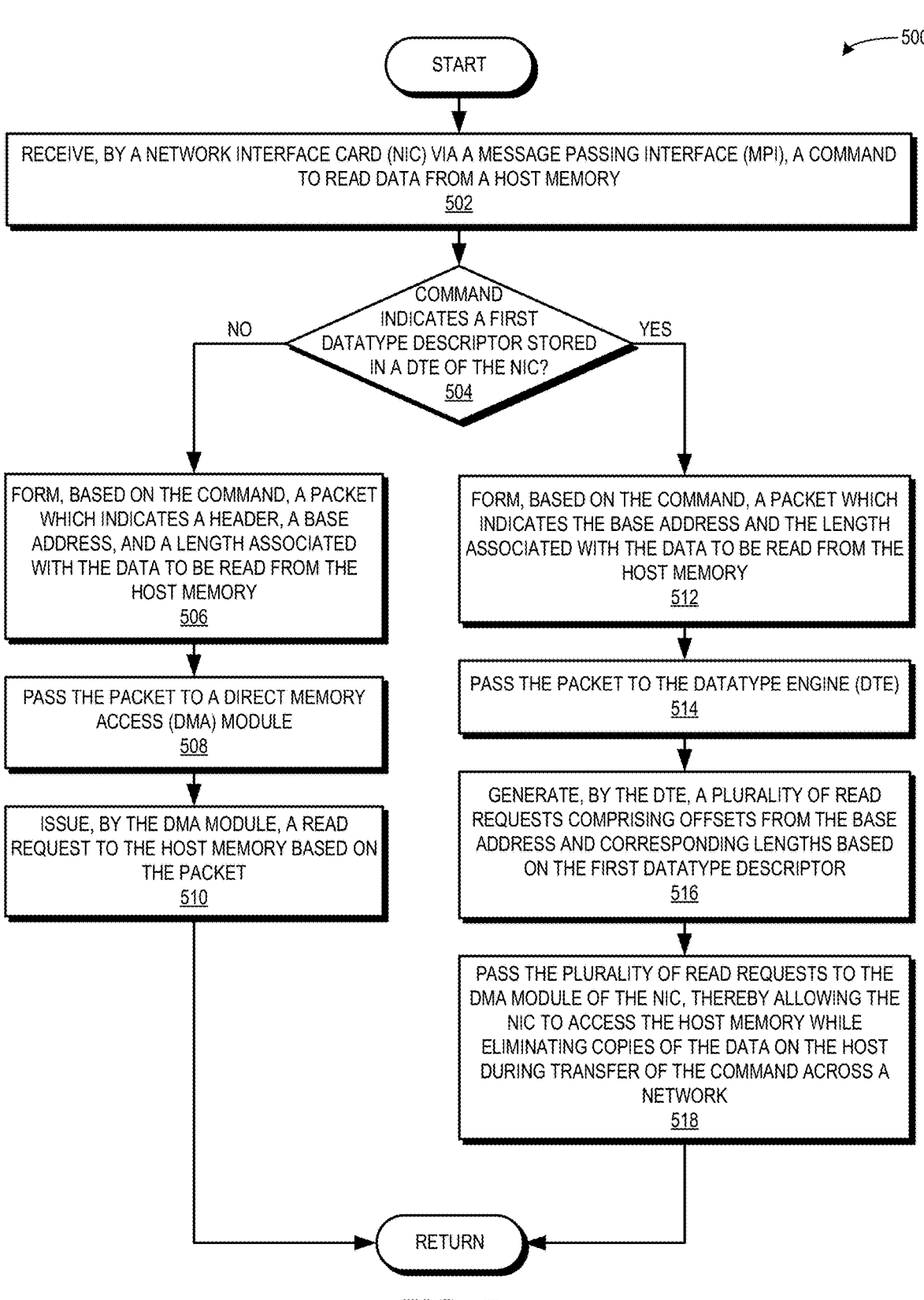
FIG. 5 presents a flowchart illustrating a method which facilitates a datatype engine to support high performance computing, in accordance with an aspect of the present application.

FIG. 5 presents a flowchart 500 illustrating a method which facilitates a datatype engine to support high performance computing, in accordance with an aspect of the present application. During operation, the system receives, by a network interface card (NIC) via a message passing interface (MPI), a command to read data from a host memory (operation 502). The system determines whether the command indicates a first datatype descriptor stored in a datatype engine (DTE) of the NIC. If the command does not indicate the first datatype descriptor stored in the DTE (decision 504), the system forms, based on the command, a packet which indicates a header, a base address, and a length associated with the data to be read from the host memory (operation 506). The system passes the packet to a direct memory access (DMA) module (operation 508). The system issues, by the DMA module, a read request to the host memory based on the packet (operation 510), and the operation returns.

If the system determines that the command indicates a first datatype descriptor stored in a datatype engine of the NIC (decision 504), the system forms, based on the command, a packet which indicates the base address and the length associated with the data to be read from the host memory (operation 512). The system passes the packet to the datatype engine (operation 514). The system generates, by the datatype engine, a plurality of read requests comprising offsets from the base address and corresponding lengths based on the first datatype descriptor (operation 516). The system passes the plurality of read requests to a direct memory access (DMA) module of the NIC, thereby allowing the NIC to access the host memory while eliminating copies of the data on the host during transfer of the command across a network (operation 518). The DMA module thus issues the plurality of read requests to the host memory (not shown). The operation returns.

Figure 6:
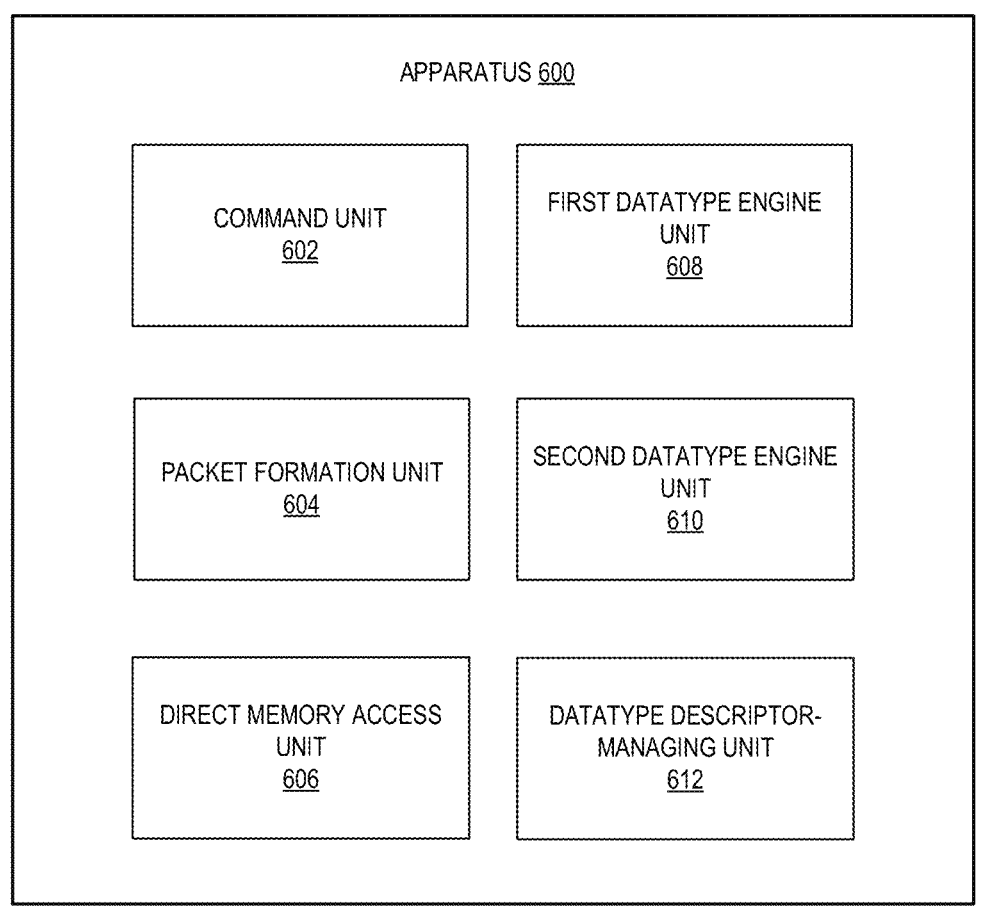
FIG. 6 illustrates an apparatus which facilitates a datatype engine to support high performance computing, in accordance with an aspect of the present application.

Apparatus which Facilitates a Datatype Engine to Support
High Performance Computing FIG. 6 illustrates an apparatus 600 which facilitates a
datatype engine to support high performance computing, in
accordance with an aspect of the present application. Appa-
ratus 600 can represent a network interface card (NIC) and
can include: a command unit 602 to receive a command to
read data from a host memory and to determine whether the
command indicates a first datatype descriptor stored in a
datatype engine of the NIC; a packet formation unit 604 to
form, based on the command, a packet which indicates a
base address and a length associated with the data to be read
from the host memory; a direct memory access unit 606 to
receive and issue read requests to host memory; a first
datatype engine unit 608 to generate a plurality of read
requests comprising offsets from the base address and cor-
responding lengths based on the first datatype descriptor and
to pass the read requests to a DMA module of the NIC,
wherein first datatype engine unit 608 is further to process
transmit operations related to performing read operations
from the host memory; a second datatype engine unit 610 to
process receive operations related to performing write
operations to the host memory; and a datatype descriptor-
managing unit 612 to store one or more datatype descriptors
created by a user.

Command unit 602 can correspond to, e.g., command
queue 114 of FIG. 1 and packets received by packet forma-
tion module 302 from commands 320 of FIG. 3. First
datatype engine 608 can correspond to, e.g., outbound
transfer engine 116 of FIG. 1 and OXE 301 of FIG. 3, while
second datatype engine 610 can correspond to inbound
transfer engine 120 of FIG. 1. Packet formation unit 604 can
correspond to packet formation module 302 of FIG. 3, and
direct memory access unit 606 can correspond to DMA
module 306 of FIG. 3. Datatype descriptor managing-unit
612 may reside in, e.g., first datatype engine 608 and second
datatype engine unit 610. The units described as part of
apparatus 600 may perform the operations described above
in relation to FIGS. 1, 3, and 5.

In general, the disclosed aspects provide a system,
method, apparatus, and non-transitory storage medium for
facilitating a datatype engine to support high performance
computing. In one aspect, the system receives, by a network
interface card (NIC) via a message passing interface, a
command to read data from a host memory. The system
determines that the command indicates a first datatype
descriptor stored in a datatype engine of the NIC. The
system forms, based on the command, a packet which
indicates a base address and a length associated with the data
to be read from the host memory. The system passes the
packet to the datatype engine. The system generates, by the
datatype engine, a plurality of read requests comprising
offsets from the base address and corresponding lengths
based on the first datatype descriptor. The system passes the
plurality of read requests to a direct memory access (DMA)
module of the NIC, thereby allowing the NIC to access the
host memory while eliminating copies of the data on the host
during transfer of the command across a network.

In a variation on this aspect, responsive to determining
that the command does not indicate a datatype descriptor
stored in the datatype engine of the NIC, the system passes
the packet to the DMA module, wherein the packet is formed
to indicate a header, the base address, and the length
associated with the data to be read from the host memory.
The system issues, by the DMA module, a read request to the
host memory based on the packet.

In a further variation, the datatype descriptor represents a
multi-dimensional array which includes: a number of ele-
ments in each dimension; a size of a block to be transferred;
and a stride in each dimension.

In a further variation, the datatype descriptor represents an
array of 256 byte masks indicating which bytes of the data
to be read from the host memory are to be returned in
response to the command.

In a further variation, the datatype descriptor references
an input/output vector (IOVEC) which indicates addresses
and lengths of data to be read from the host memory. The
IOVEC uses at least one of: relative addressing, in which the
indicated addresses to be read from the host memory com-
prise offsets from a base virtual address indicated in the
command; and absolute addressing, in which the indicated
addresses to be read from the host memory comprise virtual
addresses corresponding to the data to be read.

In a further variation, the system creates, by a user
associated with the command, one or more datatype descrip-
tors. The system stores, by the datatype engine, the one or
more datatype descriptors.

In a further variation, the datatype engine comprises: a
first instance in an outbound packet engine which processes
transmit operations related to performing read operations,
including the command to read the data from the host
memory; and a second instance in an inbound packet engine
which processes receive operations related to performing
write operations, including a command to write data to the
host memory.

In a further variation, the system issues, by the DMA
module, the plurality of read requests to the host memory to
obtain the data indicated in the command.

Another aspect provides a non-transitory computer-read-
able storage medium storing instructions that when executed
by a computer cause the computer to perform the method
described herein.

Yet another aspect provides a network interface card
(NIC) which comprises a command module to receive, via
a message passing interface, a command to read data from
a host memory. The NIC further comprises a packet forma-
tion module to: determine whether the command indicates a
first datatype descriptor stored in a first datatype engine of
the NIC; responsive to determining that the command indi-
cates the first datatype descriptor, form, based on the com-
mand, a packet which indicates a base address and a length
associated with the data to be read from the host memory;
and pass the packet to the first datatype engine. The NIC
further comprises the first datatype engine to: generate a
plurality of read requests comprising offsets from the base
address and corresponding lengths based on the first data-
type descriptor; and pass the plurality of read requests to a
direct memory access (DMA) module of the NIC, thereby
allowing the NIC to access the host memory while elimi-
nating copies of the data on the host during transfer of the
command across a network. The NIC further comprises the
DMA module to issue the plurality of read requests to the
host memory to obtain the data indicated in the command.

In a variation on this aspect, the apparatus further com-
prises an inbound packet engine and an outbound packet
engine. The first datatype engine resides in the outbound
packet engine which processes transmit operations related to
performing read operations, including the command to read
the data from the host memory, and a second datatype engine
resides in the inbound packet engine which processes
receive operations related to performing write operations,
including a command to write data to the host memory.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
receiving, by a network interface card (NIC), a first command to read data from a host memory;
determining whether the first command indicates a datatype descriptor associated with the data in the host memory;
in response to determining that the first command indicates the datatype descriptor, generating read requests comprising information related to a base address and corresponding lengths for the data to be read based on the datatype descriptor; and
processing, by a direct memory access (DMA) module of the NIC, the generated read requests.

2. The method of claim 1, wherein processing the generated read requests by the DMA module further comprises:
issuing, by the DMA module, the generated read requests to the host memory to obtain the data indicated in the first command;
eliminating copies of the data on the host in response to transferring the command across a network; and
providing the NIC with access to the host memory while eliminating the copies of the data on the host.

3. The method of claim 1, wherein in response to determining that the command indicates the datatype descriptor, the method further comprises:
obtaining the datatype descriptor from a data structure maintained by the NIC; and
generating, by a datatype engine of the NIC, the read requests comprising the information related to the base address and the corresponding lengths based on the obtained datatype descriptor.

4. The method of claim 1, further comprising:
receiving a second command to install the datatype descriptor in a data structure maintained by the NIC; and
installing, in the data structure maintained by the NIC, the datatype descriptor of the second command prior to receiving the first command to read data from the host memory.

5. The method of claim 4, further comprising:
selecting, for the first command and the second command, a path through the NIC from a plurality of paths comprising a series of parallel queues,
wherein selecting the path comprises identifying a same path through the NIC for the first command and the second command by performing a hash of one or more fields associated with the first command and the second command.

6. The method of claim 4, further comprising:
completing the second command; and
responsive to completing the second command, providing access by subsequent commands to the installed datatype descriptor.

7. The method of claim 1, wherein the datatype descriptor references at least one of:

a multi-dimensional array comprising a number of elements in each dimension, a size of a block to be transferred, and a stride in each dimension; and
an input/output vector (IOVEC) indicating addresses and lengths of data to be read from the host memory.

8. A network device, comprising:
at least one processing resource; and
a storage device storing instructions which when executed by the at least one processing resource comprise instructions to:
receive, by a network interface card (NIC), a first command to read data from a host memory;
determine whether the first command indicates a datatype descriptor associated with the data in the host memory;
in response to determining that the first command indicates the datatype descriptor, generate read requests comprising information related to a base address and corresponding lengths for the data to be read based on the datatype descriptor; and
process, by a direct memory access (DMA) module of the NIC, the generated read requests.

9. The network device of claim 8, wherein the instructions to process the generated read requests by the DMA module further comprise instructions to:
issue, by the DMA module, the generated read requests to the host memory to obtain the data indicated in the first command;
eliminate copies of the data on the host in response to transferring the command across a network; and
provide the NIC with access to the host memory while eliminating the copies of the data on the host.

10. The network device of claim 8, wherein in response to determining that the command indicates the datatype descriptor, the instructions are further to:
obtain the datatype descriptor from a data structure maintained by the NIC; and
generate, by a datatype engine of the NIC, the read requests comprising information related to the base address and the corresponding lengths based on the obtained datatype descriptor.

11. The network device of claim 8, wherein the instructions are further to:
receive a second command to install the datatype descriptor in a data structure maintained by the NIC; and
install, in the data structure maintained by the NIC, the datatype descriptor of the second command prior to receiving the first command to read data from the host memory.

12. The network device of claim 11, wherein the instructions are further to:
select, for the first command and the second command, a path through the NIC from a plurality of paths comprising a series of parallel queues; and
identify a same path through the NIC for the first command and the second command by performing a hash of one or more fields associated with the first command and the second command.

13. The network device of claim 11, wherein the instructions are further to:
complete the second command; and
responsive to completing the second command, provide access by subsequent commands to the installed datatype descriptor.

14. The network device of claim 8, wherein the datatype descriptor references at least one of:

a multi-dimensional array comprising a number of elements in each dimension, a size of a block to be transferred, and a stride in each dimension; and an input/output vector (IOVEC) indicating addresses and lengths of data to be read from the host memory.

15. A non-transitory computer-readable storage medium storing instructions that when executed by a computer cause the computer to perform a method, the method comprising:

receiving, by a network interface card (NIC), a first command to read data from a host memory;

determining whether the first command indicates a datatype descriptor associated with the data in the host memory;

in response to determining that the first command indicates the datatype descriptor, generating read requests comprising information related to a base address and corresponding lengths for the data to be read based on the datatype descriptor; and processing, by a direct memory access (DMA) module of the NIC, the generated read requests.

16. The non-transitory computer-readable storage medium of claim 15, wherein processing the generated read requests by the DMA module further comprises:

issuing, by the DMA module, the generated read requests to the host memory to obtain the data indicated in the first command;

eliminating copies of the data on the host in response to transferring the command across a network; and providing the NIC with access to the host memory while eliminating the copies of the data on the host.

17. The non-transitory computer-readable storage medium of claim 15, wherein in response to determining that the command indicates the datatype descriptor, the method further comprises:

obtaining the datatype descriptor from a data structure maintained by the NIC; and generating, by a datatype engine of the NIC, the read requests comprising the information related to the base address and the corresponding lengths based on the obtained datatype descriptor.

18. The non-transitory computer-readable storage medium of claim 15, wherein the method further comprises:

receiving a second command to install the datatype descriptor in a data structure maintained by the NIC; and installing, in the data structure maintained by the NIC, the datatype descriptor of the second command prior to receiving the first command to read data from the host memory.

19. The non-transitory computer-readable storage medium of claim 18, wherein the method further comprises:

selecting, for the first command and the second command, a path through the NIC from a plurality of paths comprising a series of parallel queues, wherein selecting the path comprises identifying a same path through the NIC for the first command and the second command by performing a hash of one or more fields associated with the first command and the second command.

20. The non-transitory computer-readable storage medium of claim 18, wherein the method further comprises:

completing the second command; and responsive to completing the second command, providing access by subsequent commands to the installed datatype descriptor.

*    *    *    *    *